United States Patent [19]

Kawamoto

[11] 4,337,673

[45] Jul. 6, 1982

[54] CONTROL APPARATUS FOR A VEHICLE POWER TRANSMISSION

[75] Inventor: Tamio Kawamoto, Sagamihara, Japan

[73] Assignee: Nissan Motor Co., Ltd., Yokohama, Japan

[21] Appl. No.: 116,638

[22] Filed: Jan. 29, 1980

[30] Foreign Application Priority Data

Jan. 30, 1979 [JP] Japan ................................. 54/9871

[51] Int. Cl.³ ...................... F16H 57/06; G05G 5/06; G05G 9/18
[52] U.S. Cl. ........................................ 74/475; 74/476
[58] Field of Search ..................... 74/473 R, 475, 476, 74/477

[56] References Cited

U.S. PATENT DOCUMENTS

| 1,938,796 | 12/1933 | Bernard | 74/476 |
| 2,924,124 | 2/1960 | Froslie | 74/475 X |
| 3,192,788 | 7/1965 | Fodrea | 74/476 X |
| 3,866,488 | 2/1975 | Nakata et al. | 74/475 |
| 3,939,724 | 2/1976 | Takahashi et al. | 74/475 X |
| 4,126,055 | 11/1978 | Forsyth | 74/476 |
| 4,174,644 | 11/1979 | Nagy et al. | 74/477 |

FOREIGN PATENT DOCUMENTS

| 2949354 | 6/1980 | Fed. Rep. of Germany . |
| 1056206 | 1/1967 | United Kingdom . |
| 1418764 | 12/1975 | United Kingdom . |

Primary Examiner—Allan D. Herrmann
Attorney, Agent, or Firm—Thompson, Birch, Gauthier & Samuels

[57] ABSTRACT

A control apparatus for a vehicle power transmission includes a reverse misselection preventing mechanism and a selection check mechanism. Both of the mechanisms are arranged in close vicinity to each other, and respectively include a member formed integrally with a shifter bracket which connects a manually operated control lever with a fork rod for selecting and shifting into or from different gear shift positions. This integrated apparatus allows a reduced number of required parts and assembling steps.

2 Claims, 7 Drawing Figures

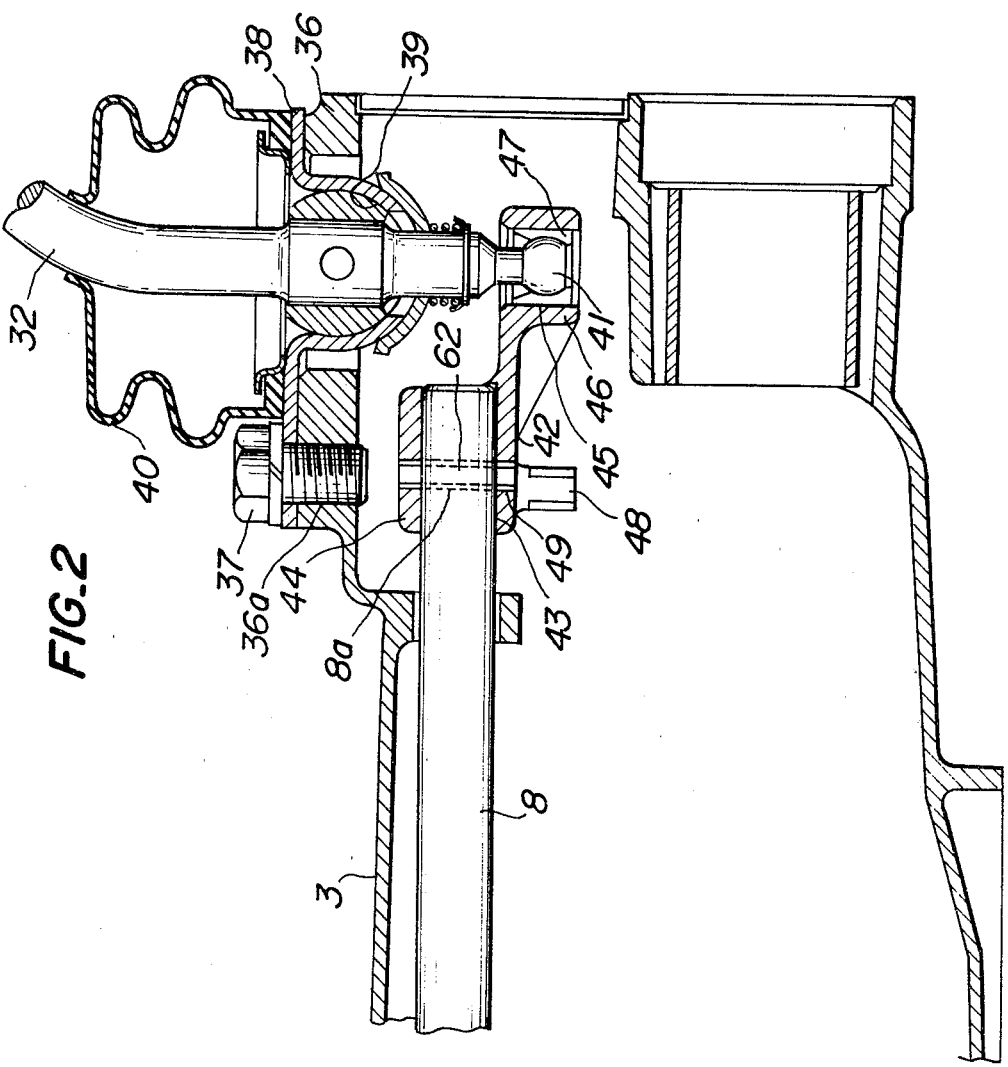

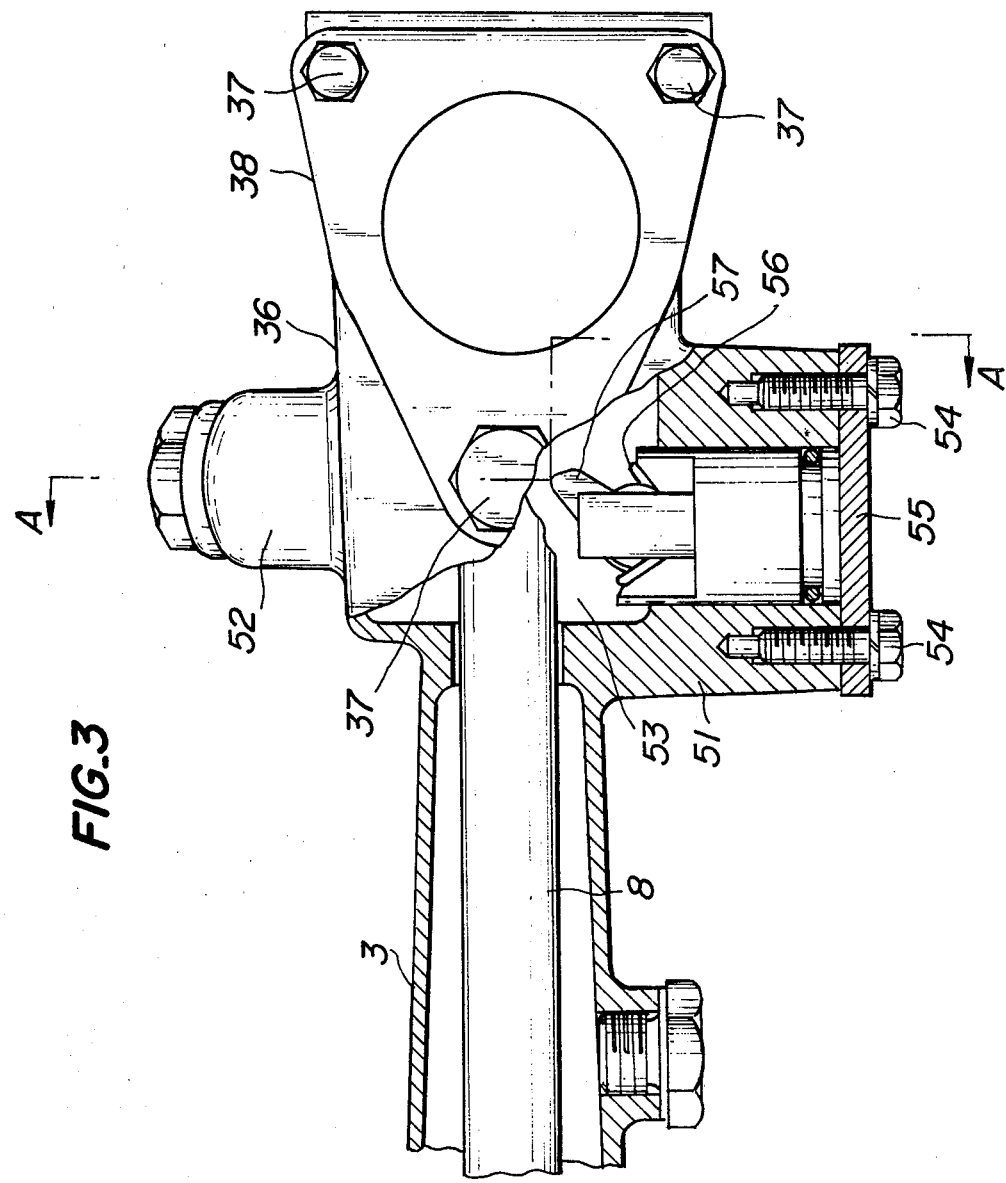

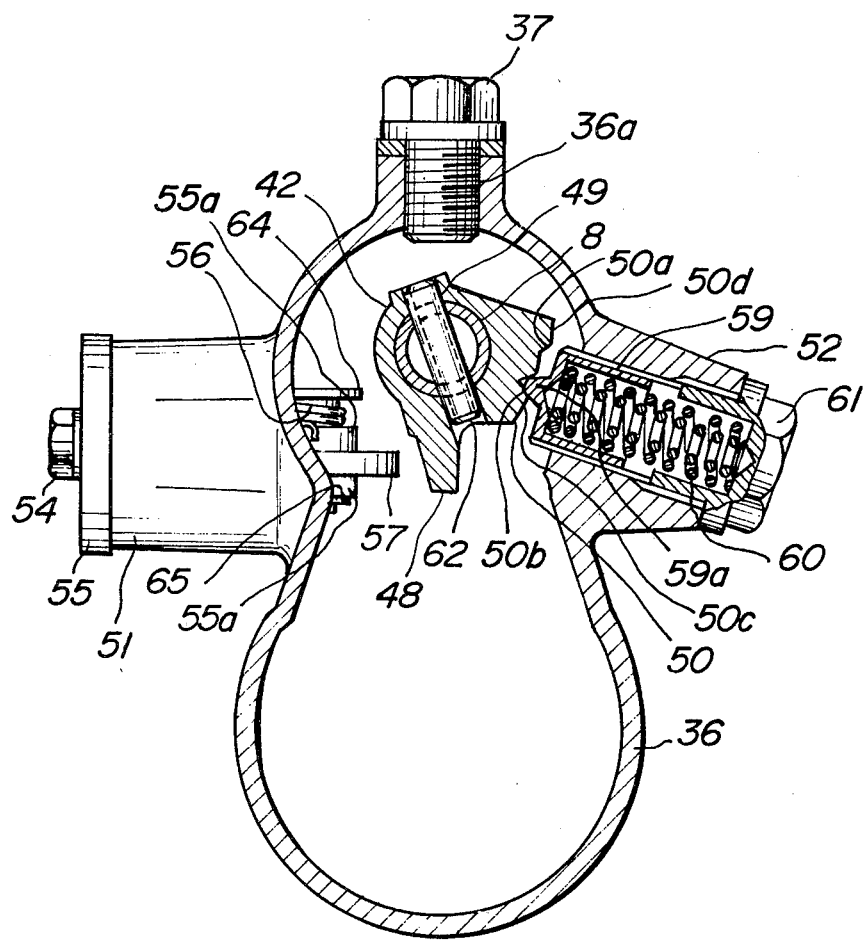
FIG_4

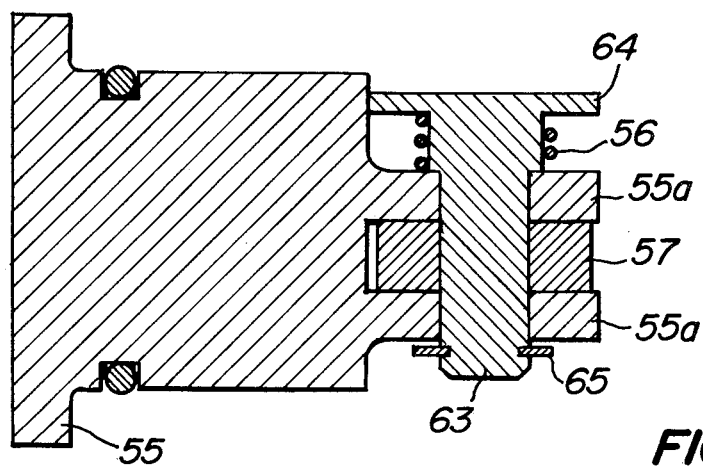
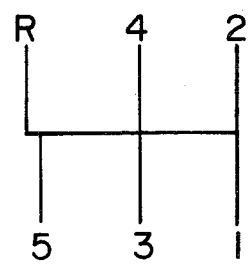
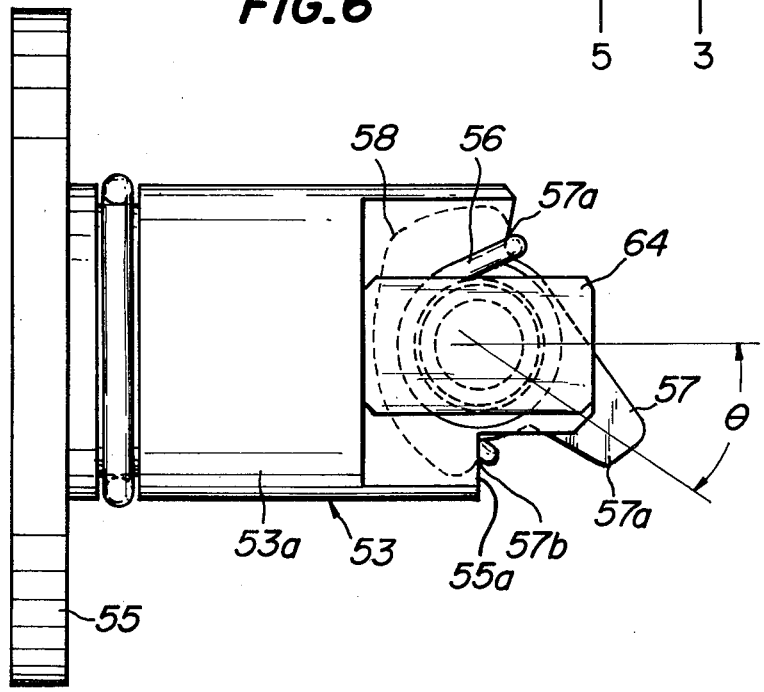

CONTROL APPARATUS FOR A VEHICLE POWER TRANSMISSION

The present invention relates to a control apparatus for a vehicle power transmission, including a reverse misselection preventing mechanism and a selection check mechanism.

A previously known transmission is provided with a rotatable and axially movable fork rod for effecting shifting into, or from different gear shift positions, and a manually operated control lever connected, by means of a shifter bracket, to the fork rod for effecting the rotation and/or axial movement thereof, and having a shift pattern in which a forward running gear shift position and a reverse running gear shift position are located substantially on the same shift operational line of the control lever.

In such a conventional transmission, in order to prevent inadvertent shifting into the reverse running gear shift position at the time of shifting from the forward running gear shift position, e.g. at the time of downshifting from the fifth speed gear shift position, the control lever, whose end is connected to the shifter bracket, is usually provided with a reverse misselection preventing mechanism. Further, in order to positively indicate the selected positions of the fork rod, the fork rod is provided with a so-called selection check mechanism. Those two mechanisms constitute the control apparatus which is the subject matter of the present invention.

Since, in the conventional control apparatus, the two mechanisms are arranged separately, corresponding parts are required which have to be separately manufactured and assembled. This causes increased assembly time and costs.

An object of the present invention is to provide an improved control apparatus for a vehicle power transmission in which the reverse misselection preventing mechanism and the selection check mechanism are integrated, allowing the reduction of assembling steps and costs.

According to the present invention, there is provided a control apparatus for a vehicle power transmission including a rotatable and axially movable fork rod for effecting shifting into or from different gear shift positions, and a manually operated control lever connected, by means of a shifter bracket, to the fork rod for effecting the rotation and/or axial movement thereof, and having a shift pattern in which a forward running gear shift position and a reverse running gear shift position are located substantially on the same shift operational line, the control apparatus comprising: a reverse misselection preventing mechanism which prevents shifting from said forward running gear shift position directly into the reverse running gear shift position, and which includes a first member formed integrally with the shifter bracket and projecting radially outwardly of the fork rod, and a second member supported by a housing for the control lever, the second member being movable between a first position in which the first and the second members abut each other to prevent rotation of the fork rod, and a second position in which the first member is not prevented by the second member from permitting rotation of the fork rod; and a selection check mechanism which provides selection click feeling when the fork rod is rotated to a selected position in which shift can be made into at least one of the gear shift positions, and which includes a first member formed integrally with the shifter bracket in the vicinity of said first member of the reverse misselection preventing mechanism, a second member movably supported by said housing, and a resilient means urging the second member against the first member, one of the first and the second members having such a profile as to cooperate with the other to produce said selection click feeling.

The present invention will now be explained in detail by referring to a preferred embodiment shown in the drawings, in which:

FIG. 2 is a longitudinal-sectional view, in an enlarged scale, of the control apparatus according to one embodiment of the present invention;

FIG. 3 is a top plan view, partly in section of the control apparatus shown in FIG. 2;

FIG. 4 is a cross-sectional view taken along line A—A of FIG. 3;

FIG. 5 is a longitudinal-sectional view of one example of reverse misselection preventing mechanism forming part of the apparatus according to the present invention;

FIG. 6 is a top plan view of the mechanism shown in FIG. 5; and

FIG. 7 is a diagram showing the shift pattern of the transmission to which the present invention is applied.

Figure 1:
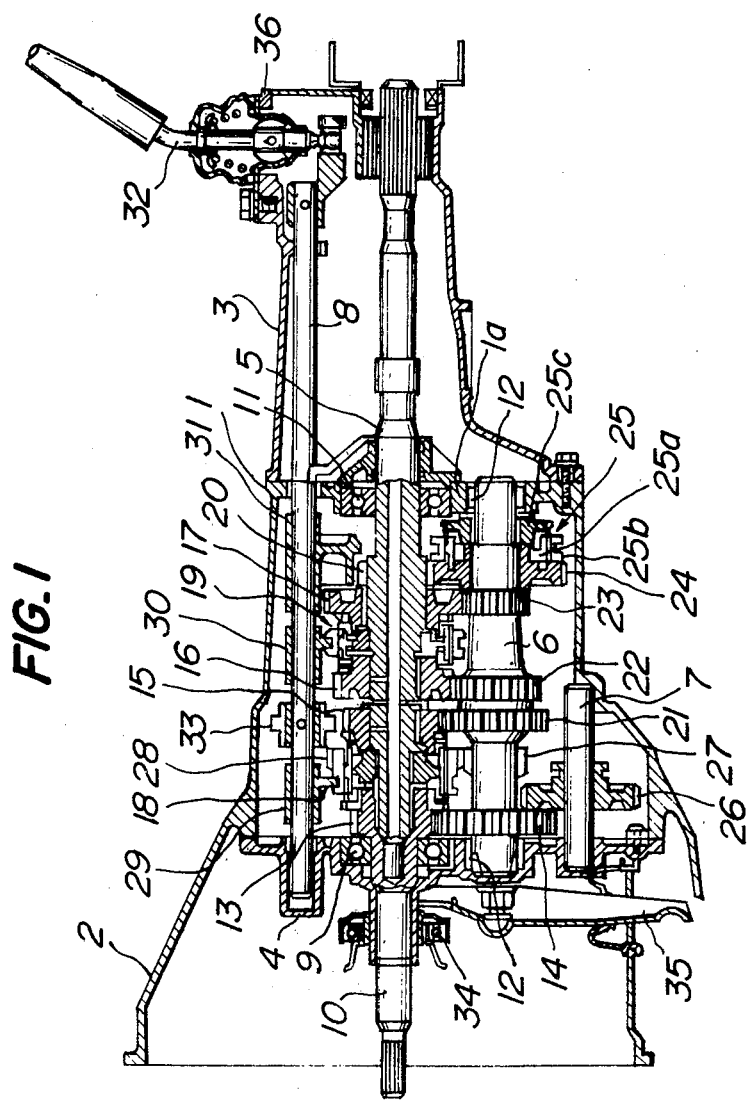
FIG. 1 is a longitudinal-sectional view of a vehicle power transmission incorporating the control apparatus according to the present invention.

Referring firstly to FIG. 1, reference numeral 1 designates a transmission casing formed integrally with a clutch housing 2. An extension casing 3 is formed separately of the transmission casing 1 and is secured by screws on the rear end thereof. A front cover 4 is mounted on the front surface of the transmission casing 1. The transmission casing 1, the extension casing 3 and the front cover 4 jointly form a gear housing. In the gear housing, a main shaft 5, a counter shaft 6, an idle shaft 7 and a fork rod or a control shaft 8 are supportably mounted parallel to the longitudinal direction.

The front end of the main shaft 5 is axially journaled and is free to rotate in a hollow rear end of a main drive shaft 10 supported by a bearing 9 mounted in the front cover 4. The main shaft 5 is supported at the middle portion thereof by a rear end wall of the transmission casing 1 by means of a bearing 11, and the rear end of the main shaft 5 is arranged to extend to a rear end position of the extension casing 3. The counter shaft 6 is supported at its front and rear ends by the front cover 4 and the rear end wall 1a of the transmission casing 1, respectively, in bearings 12 and 12. The idle shaft 7 is supported at its both ends by the front cover 4 and a part of the transmission casing 1. The fork rod 8 extends between the transmission casing 1 and the extension casing 3, and is permitted, within limited ranges, to rotate about the own axis and to move axially.

The main drive shaft 10 is rotatably driven by the engine via a clutch shown at C. The torque is transmitted to the counter shaft 6 through a main drive gear 13 provided at rear end of the main drive shaft 10 and a counter gear 14 meshing therewith. On the main shaft 5 are rotatably mounted a third speed gear 15, a second speed gear 16 and a first speed gear 17 in this sequence from the front end of the shaft. There are mounted on the main shaft 5, synchronizers 18 and 19 between the main drive gear 13 and the third speed gear 15, and between the second speed gear 16 and the first speed gear 17, respectively. Furthermore, there is provided an overdrive gear 20 located adjacent to the rear side of the first speed gear 17.

The counter shaft 6 comprises a third gear 21, a second gear 22 and a first gear 23 which are formed integrally with the shaft 6 and which are adapted to be meshed with the respective speed gears 15, 16 and 17. At the rear end side of the first gear 23, there are provided a rotatably mounted overdrive gear 24 meshing with said overdrive gear 20, and a synchronizer 25 located adjacent thereto. This synchronizer 25 has a synchro-hub 25a spline-coupled with the overdrive gear 24 so as to allow rotation of a coupling sleeve 25b relative to the shaft 6, and a clutch 25c spline-coupled with the shaft 6 to rotate with said shaft.

On the idle shaft 7, a reverse idle gear 26 is axially movably mounted. When the reverse idle gear 26 is moved rightwardly from the position indicated, it meshes with a reverse gear 27 formed integrally with the counter shaft 6, and with a reverse gear 28 formed on the periphery of the coupling sleeve 18a of the synchronizer 18.

The fork rod 8 carries forks 29, 30 and 31 at their respective boss portions, each corresponding to the synchronizers 18, 19 and 25, respectively. Each free end of these forks 29, 30 and 31 is arranged angularly spaced from each other about the axis of the fork rod 8. When the fork rod 8 is rotated about its axis by the control lever 32, a shift interlock mechanism 33, formed integrally with the fork rod 8, selects one of the forks, and the thus selected fork is moved axially as the axial movement of the fork rod 8 takes place. An end of a lever pivotally mounted on the casing is arranged to abut with the aforementioned reverse idle gear 26. Another end of the lever is arranged to extend in parallel with the fork rods 8. At the time of selecting the reverse running condition, this lever is swung by the shift interlock mechanism 33 to move the reverse idle gear 26 axially.

In FIG. 1, reference numeral 34 designates a reverse bearing, and 35 a withdrawal lever, both provided to disengage the clutch C.

FIG. 2 shows the control apparatus according to the present invention, which includes the manually operated control lever 32. The rear end of the extension casing 3 is formed as a control lever housing 36 to which is secured, by means of bolts 37, a bracket 38 which holds the control lever 32 in position. The bracket is formed with a spherical seat 39 which pivotally supports the control lever 32. There is provided a bellow or cover 40 made of flexible material, such as synthetic rubber, which has its lower end tightly secured to the bracket 38 and an upper end tightly encircling the outer periphery of upwardly projecting portion of the control lever 32. The cover 40 serves to seal off the entry of foreign matter, such as dust, into the gear housing.

The lower end of the control lever 32 forms a spherical surface portion 41 which is connected to a portion of a shifter bracket 42 fixedly connected to the rear end of the fork rod 8.

One end of the shifter bracket 42 is formed as a cylindrical portion 44 having a through bore 43 for receiving the fork rod 8, while the other end of the shifter bracket 42 is formed as a cylindrical portion 46 having a through bore 45 whose axis is perpendicular to that of the through bore 43. The latter through bore 45 axially slidably receives a spherical seat 47 mating with the spherical surface portion 41 of the control lever 32.

The cylindrical portion 44 of the shifter bracket 42 is provided with sidewisely projecting misselection preventing claw 48. A through bore 49 is formed in the cylindrical portion 44 in parallel with the longitudinal direction of the claw 48. A pin 62 for connecting the shifter bracket 42 to the fork rod 8 is press-fitted into the bore 49. The rear end of the fork rod 8 is formed with a through bore 8a which is aligned with the bore 49. The bores 8a and 49 are in line with the threaded bore 36a of the control lever housing 36 for receiving the bolt 37 such that the threaded bore 36a may be used to insert the pin 62 into the bores 8a and 49 for assembling the mechanism.

The cylindrical member 44 is further provided with a check portion 50 forming part of a selection check mechanism. As shown in FIG. 4, the check portion 50 is angularly spaced from the claw 48 about the axis of the fork rod 8, and has a contour which defines two recesses 50a and 50b as well as two inclined surfaces 50c and 50d.

As shown in FIG. 3, opposite sides of the control lever housing 36 are respectively formed as a housing portion 51 accommodating therein a reverse misselection preventing mechanism, and a housing portion 52 accommodating therein a plunger forming part of the selection check mechanism. Details of those mechanisms will be described hereinafter.

Referring to FIGS. 3 and 4, the reverse misselection preventing mechanism 53 accommodated in the housing portion 51 comprises on its one end a bracket 55 fixedly connected to the end surface of the portion 51 by means of bolts 54, and on its other end two projections 55a and 55a between which a cam 57 is rotatably supported by means of a pin 63 (see FIGS. 5 and 6 also). One end of the pin 63 is formed as a flange 64 which, together with one of the projections 55a, holds a coil spring 56 in position. Each end of the coil spring 56 engages with each shoulder portion 57a or 57b, of the cam 57, respectively, so that counterclockwise rotation of the cam 57 as seen in FIG. 6 is resisted by the resilient force of the spring 56. This counterclockwise rotation of the cam 57 is limited by the restricting portion 58 formed by an edge at one end of the cam 57, as the portion 58 abuts against the main body 53a of the mechanism 53. The other end of the cam 57 projects inwardly of the rotational trajectory of the misselection preventing claw 48. Shown at 65 is a snap ring which engages the other end of the pin 63 to prevent withdrawal thereof.

The transmission to which the present invention may conveniently be applied has a shift pattern as shown in FIG. 7 in which the fifth speed gear shift position (5) and the reverse gear shift position (R) are aligned or located on substantially the same shift operational line of the control lever 32. Thus, downshift operation from the fifth speed gear shift position must not accidentally result in shift operation into the reverse gear shift position.

According to the present invention, such an undesirable misselection can be effectively prevented in the following manner.

When the control lever 32 is operated from the neutral position shown in FIG. 4 to select and shift into the fifth speed gear shift position, the shifter bracket 42 rotates clockwisely until the claw 48 abuts the cam 57. In other words, as shown in FIG. 6, the claw 48 causes the cam 57 to rotate clockwisely against the force of the coil spring 56 allowing the desired shift operation to be completed.

When, on the other hand, a downshift operation is to be effected from the fifth speed gear shift position, clockwise rotation in FIG. 4 of the claw 48 is restricted by the shoulder portion 57a of the cam 57 so that the cam 57 is rotated counterclockwisely in FIG. 6 until the restricting portion 58 abuts with the main body 53a of the mechanism 53. Thus, an excessive shift movement from the forward speed gear shift position in the reverse direction is prevented. Consequently, the control lever is guided by the cam 57 and shifted toward the neutral position.

Shift operation from the neutral position to the reverse gear shift position can be effected by displacing the control lever 32 in the selecting direction by an greater amount than was necessary to select and shift into the fifth speed gear shift position. By this, the cam 57 can be rotated clockwisely in FIG. 6 against the force of the spring 56, as stated hereinbefore.

The plunger 59 of the reverse misselection preventing mechanism accommodated in the housing portion 52 may consist of a cylindrical body having a closed end. Between the inner closed end of the plunger 59 and the bottom surface of a bolt 61 forming the closed end of the housing portion 52, there is arranged a compression spring 60 which biases the plunger 59 toward the check portion 50 such that the end of the plunger 59 is urged against the check portion 50. Thus, the plunger 59 engages into the recess 50a or 50b, or rides over the inclined surface 50c or 50d, providing suitable click-feeling during the selecting operation, thereby accomplishing the so-called selection check. In FIG. 4, the check portion 50 is shown in the neutral position. As the plunger 59 rides over the inclined surface 50c, the condition can be selected in which shift can be made between the first and the second speed gear shift positions. As the plunger 59 engages into the recess 50a, the condition can be selected which permits shifting into the fifth speed gear shift position. Finally, as the plunger rides over the inclined surface 50d, the thus selected condition permits shifting into the reverse gear shift position.

As is apparent from the foregoing description, according to the present invention, the reverse misselection preventing mechanism and the selection check mechanism are arranged in close vicinity with each other. The shifter bracket 42, which connects the control lever 32 to the fork rod 8, is integrally provided with the claw 48 forming part of the reverse misselection preventing mechanism, and with a check portion 50 forming part of the selection check mechanism. Thus, both of the above-named mechanisms, which conventionally had been separately arranged, can be effectively concentrated within the control lever housing 36. Consequently, it is obvious that the present invention permits a reduction in the number of parts to be manufactured and assembled, simplification of the assembly procedure, as well as standardization of the required parts.

What is claimed is:

1. A control apparatus for a vehicle power transmission including a rotatable and axially movable fork rod for effecting shifting into or from different gear shift positions, and a manually operated control level connected, by means of a shifter bracket, to the fork rod for effecting the rotation and/or axial movement thereof, and having a shift pattern in which a forward running gear shift position and a reverse running gear shift position are located on substantially the same shift line, the improvement therein comprising:

a reverse misselection preventing mechanism which prevents shifting from the forward running gear shift position directly into the reverse running gear shift position, and which includes a first member formed integrally with the shifter bracket and projecting radially outwardly from the fork rod, and a second member supported by a housing for the control lever, said second member being movable between a first position in which said first and second members abut with each other preventing rotation of the fork rod, and a second position in which said first member is not moved by said second member permitting rotation of the fork rod; and a selection check mechanism which provides selection click feeling when the fork rod is rotated to a selected position in which a shift can be made into at least one of the gear shift positions, and which includes a first element formed integrally with the shifter bracket in the vicinity of said first member of the reverse misselection preventing mechanism, a second element movably supported by said housing, and resilient means urging said second element against said first element, one of said first and said second elements having such a profile as to cooperate with the other to produce said selection click feeling.

2. The apparatus as claimed in claim 1, wherein said reverse misselection preventing mechanism and said selection check mechanism are disposed at locations which are angularly spaced apart around the periphery of the fork rod.

* * * * *